United States Patent [19]

Park et al.

[11] Patent Number: 4,632,869

[45] Date of Patent: Dec. 30, 1986

[54] RESIN COMPOSITION, OPAQUE FILM AND METHOD OF PREPARING SAME

[75] Inventors: Hee C. Park, Fairport; Jeffrey J. O'Brien, Walworth; Christopher R. Fosmire, Fairport, all of N.Y.

[73] Assignee: Mobil Oil Corporation, New York, N.Y.

[21] Appl. No.: 772,087

[22] Filed: Sep. 3, 1985

[51] Int. Cl.[4] .................... B32B 3/26; B32B 31/16
[52] U.S. Cl. ......................... 428/315.5; 156/229; 264/210.7; 428/317.9; 428/327; 428/910; 521/54; 521/138
[58] Field of Search ............... 428/313.5, 315.5, 315.7, 428/315.9, 317.9, 327, 910; 521/54, 138; 264/210.7

[56] References Cited

U.S. PATENT DOCUMENTS 4,242,398 12/1980 Segawa et al. ..................... 428/298
4,377,616 3/1983 Ashcraft et al. ................. 428/315.7

Primary Examiner—William J. Van Balen
Attorney, Agent, or Firm—A. J. McKillop; M. G. Gilman; J. P. O'Sullivan, Sr.

[57] ABSTRACT

A resin combination comprising a thermoplastic polymer matrix having dispersed therein as distinct phases, a multiplicity of small spherical solid particles of polybutylene terephthalate, the resin combination in opaque biaxially oriented polymeric film form and the same oriented film structure having on at least one surface thereof a void-free thermoplastic skin layer. The process for preparing a biaxially oriented opaque film comprising providing said resin combination, forming an unoriented film of said resin combination and biaxially orienting said film to an extent sufficient to opacify the same. The process also provides for the opaque film having a void-free thermoplastic skin layer on at least one surface thereof.

13 Claims, No Drawings

RESIN COMPOSITION, OPAQUE FILM AND METHOD OF PREPARING SAME

This invention is concerned with a resin composition, an oriented opaque film composition made therefrom and to a method of forming the film structure. Oriented opaque film compositions are known in the art, for example, U.S. Pat. No. 4,377,616, discloses a film generically of the type dealt with in the present disclosure. While the opaque films of this patent are generally excellent, there are certain shortcomings that present manufacturing problems. For example, when employing nylon as the cavitating agent for polypropylene film, moisture sorption on and in the nylon particles create bubble formations in the matrix resin resulting in severe film process problems. The moisture sorption at saturation point for nylon is in the level of from about 8.5 to about 10% by weight. Coping with and attempting to avoid this problem reduces the quality of the ultimate film if the moisture is not reduced to a significant extent. In any event, the problem manifests itself as an undesirable manufacturing cost. The art is also constantly on the lookout for a film which is improved in degree of opacity versus the cost of obtaining the opacity and in enhanced brightness in the film.

It is an object of the present invention to present a resin composition capable of being formed into a superior oriented opaque film.

It is another object of the invention to prevent an improved opaque biaxially oriented film having at least one skin layer thereon.

It is yet another object of the invention to present a process for preparing such a resin composition and film structure.

SUMMARY OF THE INVENTION

The film structure of the present invention is an opaque, biaxially oriented polymeric film structure comprising:

a thermoplastic polymer matrix material within which is located a strata of voids; and positioned at least substantially within at least a substantial number of each of said voids is at least one spherical void-initiating solid particle of polybutylene terephthalate which is phase distinct and incompatible with said matrix material, the void occupied by said particle being substantially less than the volume of said void, with one generally cross-sectional dimension of said particle at least approximating a corresponding cross-sectional dimension of said void.

The invention is also directed to the foregoing film structure having on at least one surface thereof a void-free thermoplastic skin layer of a thickness such that the outer surface thereof does not, at least substantially, manifest any surface irregularities of said core layer.

The invention is also directed to a resin combination comprising a thermoplastic polymer matrix and dispersed therein, as a distinct phase, a multiplicity of small spherical solid particles of polybutylene terephthalate.

The invention is also directed to a process for preparing said resin combination comprising:

heating at least to a flowable condition a thermoplastic polymeric matrix material having a melting point lower than that of polybutylene terephthalate adding to the molten polymer polybutylene terephthalate and heating the combination to above the melting point of the polybutylene terephthalate;

subdividing and uniformly dispersing the molten polybutylene terephthalate into discrete spherical particles throughout said matrix material; and while so subdivided decreasing the temperature to solidify the polybutylene terephthalate, further decreasing the temperature to solidify said polymer matrix material.

The invention is further directed to a proceses for preparing a biaxially oriented opaque film by forming an extruded film of the above described resin combination and thereafter biaxially orienting the film either simultaneously or sequentially.

DESCRIPTION OF THE INVENTION

As in U.S. Pat. No. 4,377,616, the disclosure of which is incorporated herein by reference in its entirety, a master batch technique can be employed either in the case of forming the spherical particles in situ or in adding preformed spheres to a molten thermoplastic matrix material. After the formation of a master batch, appropriate dilution of the system can be made by adding additional thermoplastic matrix material until the desired proportions are obtained.

The polybutylene terephthalate can be present in up to about 20% by weight of the matrix film. A preferred range is from about 2 to about 10 percent by weight. When a master batch precursor composition is made for ultimate dilution with more matrix polymer for a final film, the master batch can contain as much PBT as can practically be dispersed in the thermoplastic matrix polymer in spherical subdivided particles of a size ranging from about 0.1 to about 10 microns. With little difficulty up to about 30% by weight of the PBT can be dispersed, in this size range, in the matrix resin. It is preferred that the degree of opacity of the oriented film be less than 70% light transmission. The opacity of the film can be enhanced by the inclusion in the film of from about 1 to 3% by weight of a pigment, such as $TiO_2$, colored oxides and the like. The pigment should be in a particle size such that it does not contribute in any material sense to void initiation in the matrix resin.

The polybutylene terephthalate (PBT), also known as polytetramethylene terephthalate (PTMT) is a highly crystalline polymer obained from the polycondensation of dimethyl terephthalate with 1,4-butanediol. PBT possesses good mechanical, chemical and electrical properties. It has good flowability and a rapid crystallization rate. It has a melting point of 440° F. and a glass transition temperature of approximately 104° F. It has good thermostability and relatively high UL temperature indices. This material has good tensile strength, toughness and dimensional stability, low water absorption, and low static and dynamic coefficients of friction. Typical processing conditions for PBT involve melts at 450°–500° F. Melt temperatures in excess of 520° F. should be avoided.

The thermoplastic matrix resin for the PBT resin can be any thermoplastic resin material which is incompatible with the PBT and which can be oriented in film form. By incompatible is meant that distinct phases of the two materials will result when an inter-blending of the two is attempted. Examples of such thermoplastic resins include the polyolefins, polyethylene, polypropylene, polybutylene, etc. Included also are distinct species of these materials such as ultra low density polyethylene (ULDPE), low density polyethylene (LDPE), high density polyethylene (HDPE), linear low density ethylene copolymerized with less than 10% by weight of another alpha olefin e.g. propylene, butylene, etc., random copolymers of propylene with another olefin, e.g. ethylene, butylene, hexene, etc. and any blend or mixtures of the same. Other contemplated matrix resins include polystyrene and blends with polyolefins. Particularly preferred as the matrix resin for the PBT is polypropylene.

As indicated above the PBT can be dispersed within the matrix resin in any convenient fashion. The PBT can be preformed into small spherical 0.1–10 micron particles by any technique, for example, molten spray sphere formation; subdivision into powder form followed by spraying into a high heat atmosphere; melt-dispersion of the PBT in some other hot liquid medium followed by isolation of the spherical particles, etc. An advantage of preforming the PBT into spherical particles is the avoidance of any need to subject the matrix resin to the higher temperature needed to form the PBT in situ into particles. The PBT spherical particles are the void-initiating particles in the selected matrix resin on film orientation thereof.

The general method of forming the opaque oriented film of the present invention is accomplished by slot extruding a film of the resin composition (matrix plus PBT) and thereafter sequentially biaxially orienting the film. During the orientation a strata of voids is formed in the matrix polymer. Since the PBT particles are incompatible with the matrix material, during machine direction orientation each sphere tends to create a streamlined void. During subsequent transverse orientation, the transverse dimension of this void is correspondingly increased. During these steps, the film turns a bright white pearlescent opaque color. In some instances, in order to avoid the formation of an irregular surface as a result of the spheres and the cavitated condition of the film, a coextruded surface layer can be formed on one or both surfaces of the cavitated film. This coextruded film can be transparent or pigmented and of the same or different material as the matrix resin. The different resin may be chosen for particular characteristics, for example, heat sealability, printability, machinability, etc. When employing a surface or skin layer or layers, it is preferred that the core thickness be from about 30 to about 95% of the overall structure. Conversely, it is preferred that the combined skin thickness be about 5 to about 70% of the overall film thickness. When desired or necessary the skin layers can be sufficiently thick so that the outer surfaces thereof do not manifest any irregularities or surface projections of the core material. It has been found that spherical particles of PBT can be more easily formed and more uniformly dispersed throughout the selected thermoplastic matrix resin than, for example, nylon void initiating particles. It has also been found that PBT subdivides when subjected to the same energy to a greater extent than, e.g. nylon. This results, ultimately, in a greater number of cavitation sites of smaller size in the oriented film. In addition, the moisture sorption at saturation point for PBT is about 0.4% whereas nylon is from about 8.5–10% by weight.

The following examples illustrate the present invention.

EXAMPLE 1

A mixture of isotatic polypropylene (82 parts by weight, m.p. 160° C. and a melt index of 4.5), and polybutylene terephthalate (18 parts, by weight, m.p. 226.7° C.) were co-melted with 6 parts by weight of powdered TiO$_2$ in a co-rotating, intermeshing twin screw extruder. This sytem extruded a plurality of strands of the master batch resin combination into a water bath. Thereafter, the strands were fed through a pellitizer which subdivided the strands into pellets having an approximate dimension of about 1/16 inch in diamter and from ⅛ to ¼ inch in length. The conditions of mixing in the twin screw extruder was such that both polymers were brought to a molten condition and the intermixing action of the twin screw appendages evenly dispersed the PBT throughout the molten polypropylene as spherical particles ranging from less than 1 micron to approximately 4 microns. This arrangement was maintained on solidification of both resins.

EXAMPLE 2

A mixture of the master batch pellets prepared as in Example 1 and virgin isotatic polypropylene of the same type employed as the matrix material in Example 1 was blended in an extruder provided with a screw of L/D ratio of 20/1. The master batch resins and the polypropylene were blended to the ultimate ratio of 94 parts of polypropylene to 6 parts of PBT. The resin system was extruded as an unoriented film measuring approximately 40 mils in thickness. This sheet was subsequently oriented 5×8 times using a commercially available sequential biaxially orienting apparatus. The MD orientation temperature was about 127° C. and the TD orientation, 166° C. The resulting 1.6 mil film had an opacity of 18% transmission.

EXAMPLE 3

The process of Example 2 was repeated except that a second extruder was employed in association with the first mentioned extruder and supplied with the same virgin polypropylene but without any PBT present. A melt coextrusion was carried out while maintaining the cylinder of the core material at a temperature ranging from 190° C. to 240° C. The polypropylene to be extruded as the skin layers, was maintained at a temperature of 240° C. A film structure was co-extruded with a core thickness 80% of the total extruded thickness. The skin layers were each approximately 10% of the total thickness. The unoriented film measured approximately 40 mils in thickness. This sheet was subsequently oriented 5×8 times using a commercially available sequential biaxially oriented apparatus. The MD orientation temperature was about 127° C. and the TD orientation, 166° C. The resulting 1.5 mil film had an opacity of 20% transmission and a 45° gloss of 100%. Additionally, the film had unexpectedly high stiffness as well as an excellent water vapor transmission rate. The film had greater than expected hiding power because of its high gloss. This film had an unusually rich appearing look of lusterous satin.

It is to be understood that the biaxial orientation can be simultaneously achieved using a tenter apparatus.

What is claimed is:

1. A resin combination comprising a thermoplastic polymer matrix having dispersed therein as distinct phases, a multiplicity of small spherical solid particles of polybutylene terephthalate.

2. The resin combination of claim 1 wherein said particles are from about 0.1 to about 10 microns in size.

3. The resin combination of claim 2 wherein said polymer matrix is polypropylene.

4. The resin combination of claim 3 wherein the dispersed particle population is of such a proportion that on biaxial orientation of a film thereof said film will turn bright whitish opaque in appearance.

5. An opaque, biaxially oriented polymeric film structure comprising:
   a thermoplastic polymer matrix material within which is located a strata of voids; and
   positioned at least substantially within at least a substantial number of each of said voids is at least one spherical void-initiating solid particle of polybutylene terephthalate which is phase distinct and incompatible with said matrix material, the void occupied by said particle being substantially less than the volume of said void, with one generally cross-sectional dimension of said particle at least approximating a corresponding cross-sectional dimension of said void.

6. The film structure of claim 5 wherein said polymeric matrix material is polypropylene.

7. The film structure of claim 6 wherein said particle is from 0.1 to about 10 microns in size.

8. The film structure of claim 5 having on at least one surface thereof a void-free thermoplastic skin layer.

9. The film of claim 8 wherein said skin layer is transparent.

10. A process for preparing a biaxially oriented opaque film comprising:
    (a) providing a resin combination comprising a thermoplastic polymer matrix having dispersed therein as distinct phases, a multiplicity of small spherical solid particles of polybutylene terephthalate;
    (b) forming an unoriented film of said resin combination; and
    (c) biaxially orienting said film to an extent sufficient to opacify the same.

11. The process of claim 10 wherein a void-free thermoplastic skin layer is formed on at least one surface of said unoriented film which is thereafter biaxially oriented.

12. The process of claim 11 wherein said skin layer is transparent.

13. The process of claim 12 wherein said matrix resin is polypropylene.

* * * * *